(12) United States Patent
Fujii et al.

(10) Patent No.: US 11,273,518 B2
(45) Date of Patent: Mar. 15, 2022

(54) LINEAR FRICTION WELDING METHOD

(71) Applicant: OSAKA UNIVERSITY, Suita (JP)

(72) Inventors: Hidetoshi Fujii, Suita (JP); Yoshiaki Morisada, Suita (JP); Yasuhiro Aoki, Suita (JP); Masanori Yasuyama, Tokyo (JP); Gen Murayama, Tokyo (JP)

(73) Assignee: OSAKA UNIVERSITY, Suita (JP)

( * ) Notice: Subject to any disclaimer, the term of this patent is extended or adjusted under 35 U.S.C. 154(b) by 273 days.

(21) Appl. No.: 16/479,043

(22) PCT Filed: Feb. 1, 2018

(86) PCT No.: PCT/JP2018/003392
§ 371 (c)(1),
(2) Date: Jul. 18, 2019

(87) PCT Pub. No.: WO2018/143335
PCT Pub. Date: Aug. 9, 2018

(65) Prior Publication Data
US 2021/0129263 A1 May 6, 2021

(30) Foreign Application Priority Data
Feb. 2, 2017 (JP) .............................. JP2017-017997

(51) Int. Cl.
B23K 20/00 (2006.01)
B23K 20/12 (2006.01)
(Continued)

(52) U.S. Cl.
CPC .......... *B23K 20/1205* (2013.01); *B23K 31/12* (2013.01); *B23K 20/22* (2013.01); *B23K 2103/02* (2018.08); *B23K 2103/14* (2018.08)

(58) Field of Classification Search
CPC ................ B23K 20/12; B23K 20/2333; B23K 2103/14; B23K 2103/18; B23K 2103/26;
(Continued)

(56) References Cited

U.S. PATENT DOCUMENTS

| 5,682,677 A | 11/1997 | Mahoney |
| 2010/0119870 A1* | 5/2010 | Nojiri ................ B23K 20/2333 |
| | | 428/660 |

(Continued)

FOREIGN PATENT DOCUMENTS

| JP | 48-68449 A | 9/1973 |
| JP | 5-131280 A | 5/1993 |

(Continued)

OTHER PUBLICATIONS

JP-11077338-A computer translation (Year: 2021).*

(Continued)

*Primary Examiner* — Erin B Saad
(74) *Attorney, Agent, or Firm* — Westerman, Hattori, Daniels & Adrian, LLP

(57) ABSTRACT

A linear friction welding method capable of accurately controlling a welding temperature and capable of lowering the welding temperature is provided. The present invention is a linear friction welding method comprising: a first step of forming a welded interface by bringing one member into contact with the other member; a second step of repeatedly sliding one member and the other member on the same locus and discharging flash from the welded interface in a state where pressure is applied substantially perpendicularly to the welded interface; and a third step of forming a welded surface by stopping the sliding and setting the pressure to be not less than the yield stress and not more than the tensile strength of one member and/or the other member at a desired welding temperature.

9 Claims, 9 Drawing Sheets

(51) Int. Cl.
*B23K 31/12* (2006.01)
*B23K 103/14* (2006.01)
*B23K 103/02* (2006.01)
*B23K 20/22* (2006.01)

(58) Field of Classification Search
CPC .............. B23K 20/1205; B23K 20/121; B23K 20/129; B23K 2101/001; B23K 31/125
See application file for complete search history.

(56) References Cited

U.S. PATENT DOCUMENTS

| | | | |
|---|---|---|---|
| 2010/0270359 A1* | 10/2010 | Young | B23K 20/121 228/102 |
| 2014/0050519 A1 | 2/2014 | Oiwa et al. | |
| 2015/0190881 A1 | 7/2015 | Oiwa et al. | |

FOREIGN PATENT DOCUMENTS

| | | | |
|---|---|---|---|
| JP | 5-237670 A | | 9/1993 |
| JP | 11077338 A | * | 3/1999 |
| JP | 2000-516540 A | | 12/2000 |
| JP | 2012-200753 A | | 10/2012 |
| JP | 2012-228703 A | | 11/2012 |
| JP | 2015-164738 A | | 9/2015 |

OTHER PUBLICATIONS

International Search Report dated Apr. 10, 2018, issued in counterpart International Application No. PCT/JP2018/003392 (2 pages).
Aoki et al., "Flash formation during the Linear Friction Welding", Japan Welding Society (2016), Cited in ISR. (2 pages).
Kuroiwa et al., "Linear Friction Welding of Thin Carbon Steel Plate", Japan Welding Society (2016), Cited in ISR. (2 pages).
Kuroiwa et al., "Linear Friction Stir Welding of Medium Carbon Steel at Low Temperature", Cited in ISR. (1 page).
Kuroiwa et al., "Application of Linear Friction Welding to a Thin Carbon Steel Plate", 9th International Welding Symposium of Japan Welding Society (9WS), Oct. 11, 2016, pp. 26, 862-865, Cited in ISR. (5 pages).

\* cited by examiner

LINEAR FRICTION WELDING METHOD

TECHNICAL FIELD

The present invention relates to a linear friction welding method for solid state welding of metal materials.

BACKGROUND ART

Along with the increase in strength of metal materials such as steel and aluminum alloys, the deterioration of strength at a joint portion which determines mechanical properties of a joint structure has become a serious problem. On the other hand, in recent years, a solid-state welding method in which the maximum reaching temperature during welding does not reach the melting point of the material to be welded and the strength decrease at the welding portion is small as compared with the conventional melt welding has attracted attention, and the practical application is rapidly proceeding.

In particular, linear friction welding (LFW: Lineaer Friction Welding) in which metal members are slid in a linear locus does not require the use of tools as in friction stir welding (FSW: Friction Stir Welding), so that it can be easily applied to high melting point metals, and is expected to be put to practical use in various industries.

However, the welding mechanism of the linear friction welding, the appropriate process control method, and the like are not always clear, and the welding condition for each of the members to be joined is actually optimized based on a large number of preliminary tests, experiences, and the like.

On the other hand, for example, Patent Document 1 (Japanese Unexamined Patent Application Publication No. 2015-164738) discloses a friction welding device in which one member is repeatedly moved relative to the other member on the same trajectory while contacting the other member, and the one member is friction joined to the other member, wherein the friction welding device comprises stop means for stopping the relative movement of the one member with respect to the other member during a period from the generation of the stop command to the relative movement of the one member with respect to the other member until the one member moves the trajectory relative to the other member once in accordance with the stop command.

In the friction welding device described in Patent Document 1, when friction welding is performed by repeatedly moving one member in contact with the other member on the same trajectory and by friction welding, if a stop command for relative movement is generated at which timing, it is possible to easily specify whether the relative movement of the two members is just stopped at the timing at which the two members are in the appropriate welding state.

PRIOR ART DOCUMENT

Patent Document

[Patent Document 1] Japanese Unexamined Patent Application Publication No. 2015-164738

SUMMARY OF THE INVENTION

Problem to be Solved by the Invention

However, the friction welding method disclosed in Patent Document 1 shortens the period from the generation of the stop command to the stopping of the actuator to control the amount of friction welding, and cannot control the welding temperature which greatly affects the joint characteristics.

In the conventional linear friction welding, a softened flash is discharged from a welding interface to form a new surface to accomplish the welding, and basically, it is necessary to sufficiently raise the temperature (soften) in the vicinity of the interface to be welded by frictional heat. That is, it is difficult to accurately set a desired welding temperature, and in particular, it is more difficult to lower the welding temperature.

In view of the above problems in the prior art, it is an object of the present invention to provide a linear friction welding method capable of accurately controlling the welding temperature and reducing the welding temperature.

Means to Solve the Problems

In order to achieve the above object, the present inventor has intensively researched the relationship of welding conditions and the like on the welding temperature, and as a result, has found that the welding pressure and the welding temperature are closely related to each other, and has arrived at the present invention.

That is, the present invention provides a linear friction method comprising;

a first step of forming the interface to be welded by bringing one member into contact with the other member, a second step of repeatedly sliding the one member and the other member on the same locus while applying a pressure substantially perpendicular to the interface to be welded, and discharging flash from the interface to be welded, The method includes a third step of forming a welding surface by stopping the sliding, Setting the pressure to be greater than or equal to the yield stress and less than or equal to the tensile strength of the one member and/or the other member at the desired welding temperature.

FIG. 1 is a schematic diagram showing the situation during linear friction welding. Linear frictional welding is solid-state welding in which the main heat source is frictional heat generated when materials to be welded are rubbed together by linear motion. In the conventional linear friction welding, a material softened by an increase in temperature is discharged as a flash from the interface to be welded, so that the oxide film formed on the interface to be welded is removed, and the new surfaces are brought into contact with each other, whereby a welded portion is obtained.

In linear frictional welding, when frictional heat is generated by sliding between the materials to be welded, it is generally considered that the amount of heat generated increases with an increase in the applied pressure, and the welding temperature increases. However, when the present inventors carried out intensive studies, a phenomenon was observed in which the temperature in the vicinity of the welding interface (so-called "welding temperature") decreased with an increase in the applied pressure.

Specifically, although the frictional heat increases when the applied pressure of the linear frictional welding is increased, the softened material is continuously discharged as a flash, and therefore the "welding temperature" is determined by the pressure (the force of discharging the flash) applied to the softened material. That is, when the applied pressure is set to be high, the welded material having a higher strength (a state in which the yield strength is high)

can be discharged as a flash. Here, the "higher yield strength state" means a "lower temperature state", and therefore, the "welding temperature" is lowered by an increase in the applied pressure. Since the relationship between the yield strength and the temperature is substantially constant depending on the material, it is possible to control the welding temperature extremely accurately as compared with the case of using the frictional heat.

That is, in the present invention, the welding temperature can be controlled by setting the pressure at the time of linear frictional welding to be not less than the yield stress and not more than the tensile strength of one member and/or the other member at a desired welding temperature. Here, the discharge of the flash from the welded interface is started by setting the pressure at the time of linear friction welding to be equal to or higher than the yield stress of the welded material, and the discharge of the flash is accelerated by increasing the pressure up to the tensile strength. Like the yield stress, since the tensile strength at a specific temperature is also substantially constant depending on the material to be welded, the welding temperature corresponding to the set pressure can be realized.

In the linear friction welding method of the present invention, it is preferable to set the pressure at the time of linear friction welding to the yield stress of one member and/or the other member at a desired welding temperature. In the linear friction welding, the discharge of the flash is started at the moment when the pressure reaches the yield stress, and the desired welding temperature can be more accurately realized as compared with the case where the pressure is set to a higher value (with the tensile strength as an upper limit).

In the linear friction welding method of the present invention, it is preferable that the one member and/or the other member be made of an iron-based metal. Since the iron-based metal has mechanical properties that can withstand the welding process of the linear friction welding, deformation or the like at an unnecessary place during the welding process can be prevented by using the iron-based metal as the material to be joined. In addition, the linear frictional welding is a solid-state welding, which can suppress the deterioration of the mechanical properties of the welding portion, which is remarkably observed in general fusion welding. In the present invention, the iron-based metal means a metal mainly containing iron in composition, and includes, for example, various steels, cast iron, and the like.

Further, in the linear frictional welding method of the present invention, it is preferable that the welding temperature is set to a temperature equal to or lower than the temperature $A_1$ of the iron-based metal used as the material to be welded in the linear frictional welding method of the present invention. In iron-based metals, brittle martensite is formed by phase transformation, and there are cases in which welding is difficult and in which a welding portion is embrittled. On the other hand, by setting the welding temperature to the $A_1$ temperature or lower by the linear frictional welding method of the present invention, phase transformation does not occur, so that the formation of brittle martensite can be completely suppressed.

In the linear friction welding method of the present invention, it is preferable that the one member and/or the other member be made of titanium or a titanium alloy. Since titanium or a titanium alloy has mechanical properties that can withstand the welding process of linear friction welding, deformation or the like at an unnecessary place during the welding process can be prevented by using titanium or a titanium alloy as the material to be welded. In addition, the linear frictional welding is a solid-state welding, which can suppress the deterioration of the mechanical properties of the welding portion, which is remarkably observed in general fusion welding.

Further, in the linear friction welding method of the present invention, it is preferable that the welding temperature in the case where the material to be welded is titanium or a titanium alloy is set to be equal to or lower than the $\beta$ transus temperature of the titanium or the titanium alloy. By setting the welding temperature to be equal to or lower than the $\beta$ transus temperature of titanium or a titanium alloy, the structure of the welded portion can be made fine equiaxed grains, and a welded portion having both high strength and toughness can be formed.

Effect of the Invention

According to the present invention, it is possible to provide a linear friction welding method capable of accurately controlling the welding temperature and reducing the welding temperature.

MODE FOR CARRYING OUT THE INVENTION

Figure 1:
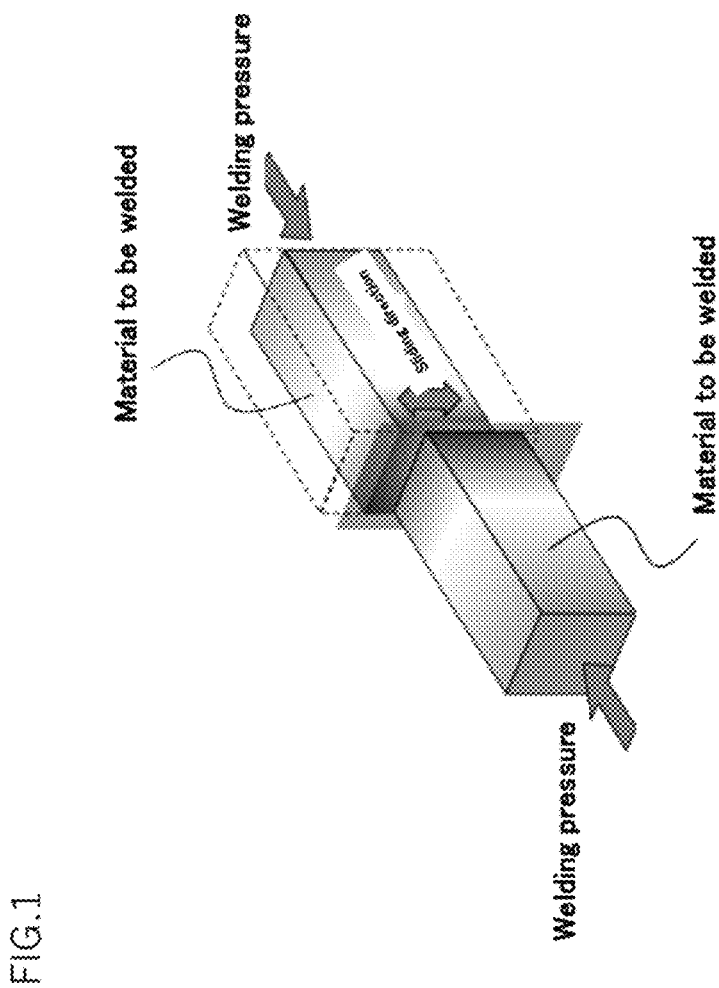
FIG. 1 is a schematic view showing an embodiment of a linear friction joint of the present invention.

Hereinafter, typical embodiments of the linear friction welding method of the present invention will be described in detail with reference to the drawings, but the present invention is not limited thereto. In the following description, the same or corresponding components are denoted by the same reference numerals, and a repetitive description may be omitted. In addition, since the drawings are for conceptually explaining the present invention, the dimensions and ratios of the components shown in the drawings may differ from actual ones.

Figure 2:
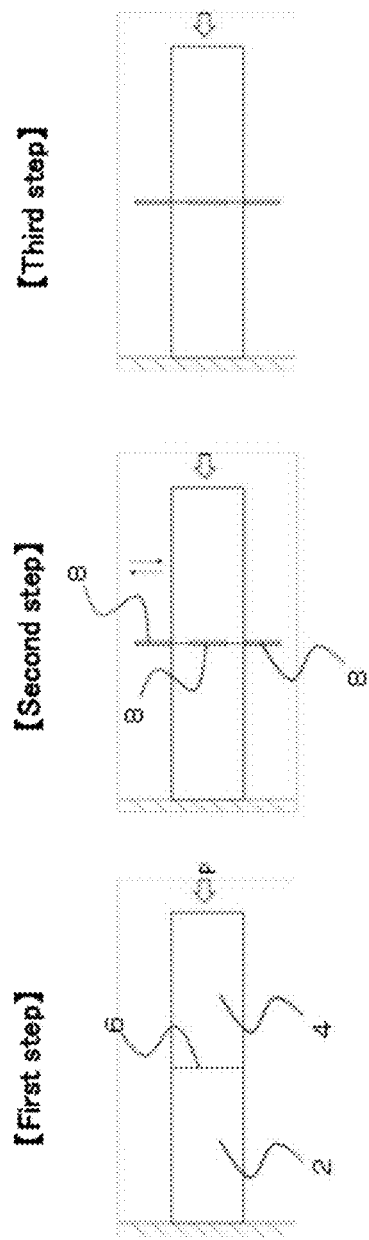
FIG. 2 is a schematic view showing the welding process of the linear friction welding according to the present invention.

FIG. 2 is a schematic view showing a welding process of the linear friction welding according to the present invention. The linear friction welding method of the present invention has a first step of forming the welded interface 6 by contacting one member 2 to the other member 4, while applying a pressure substantially perpendicular to the welded interface 6, one member 2 and the other member 4 is repeatedly slid on the same trajectory, a second step of discharging the flash 8 from the welded interface substantially parallel and substantially perpendicular to the direction of sliding, and a third step of forming the welding surface by stopping the sliding. Hereinafter, each step will be described in detail.

(1-1) First Step

The first step is a step of forming the interface 6 to be welded by bringing one member 2 into contact with the other member 4. One member 2 and/or the other member 4 are moved to a position where it is desired to form a welded portion, and the surfaces to be welded are brought into contact with each other to form a welded interface 6.

The material of the one member 2 and the other member 4 is not particularly limited as long as the effect of the present invention is not impaired, and the material may have a metallic state that can be joined by linear friction welding, but it is preferable that the material is an iron-based metal, titanium, or a titanium alloy. Since the iron-based metal, titanium, or a titanium alloy has mechanical properties that can withstand the welding process of linear friction welding, deformation or the like at unnecessary places during the welding process can be prevented by using these metals as the material to be joined. In addition, the linear frictional welding is a solid-state welding, which can suppress the deterioration of the mechanical properties of the welding portion, which is remarkably observed in general fusion welding.

The shapes and sizes of the one member 2 and the other member 4 are not particularly limited as long as the effect of the present invention is not impaired, and the interface 6 to be welded is preferably a square or a rectangle, as long as the desired pressurization, excitation, and the like can be realized by a linear friction welding apparatus. By forming the interface 6 to be welded into a square shape or a rectangular shape, it is possible to determine the timing of stopping the welding (sliding) by using the discharge state of the flash 8 as an index.

(1-2) Second Step

The second step is a step of repeatedly sliding one member 2 and the other member 4 on the same locus in a state in which the pressure P is applied substantially perpendicularly to the interface 6 to be welded, and discharging the flash 8 from the interface 6 to be welded in substantially parallel and substantially perpendicularly to the sliding direction.

The method of repeatedly sliding the one member 2 and the other member 4 on the same locus is not particularly limited as long as the effect of the present invention is not impaired, and both members may be vibrated together or one may be fixed and the other may be vibrated.

Here, in the linear frictional welding of the present invention, the welding temperature can be controlled by setting the pressure P at the time of the linear frictional welding to be not less than the yield stress and not more than the tensile strength of one member and/or the other member at a desired welding temperature. Here, the discharge of the flash 8 from the interface 6 to be welded is started by setting the pressure P to be equal to or higher than the yield stress of the material to be welded, and the discharge of the flash 8 is accelerated when the pressure P is increased up to the tensile strength. Like the yield stress, since the tensile strength at a specific temperature is also substantially constant depending on the material to be welded, the welding temperature corresponding to the set pressure P can be realized.

Figure 3:
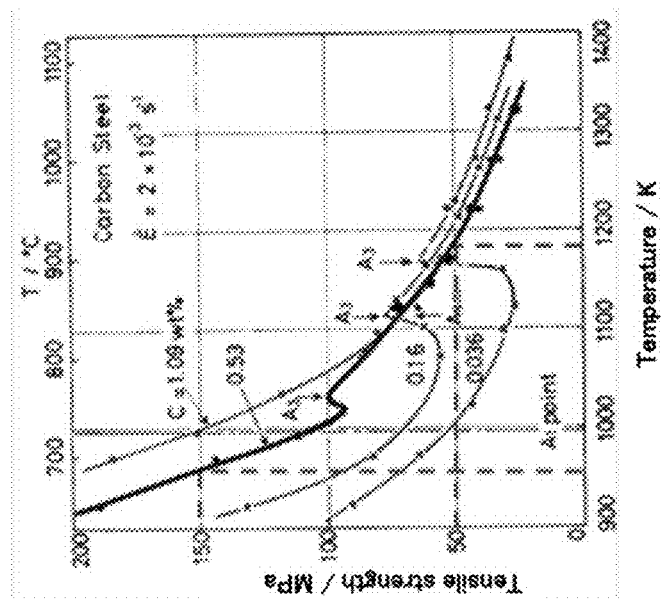
FIG. 3 is a graph showing the deformation stress (yield stress) of carbon steel at each temperature.
Figure 4:
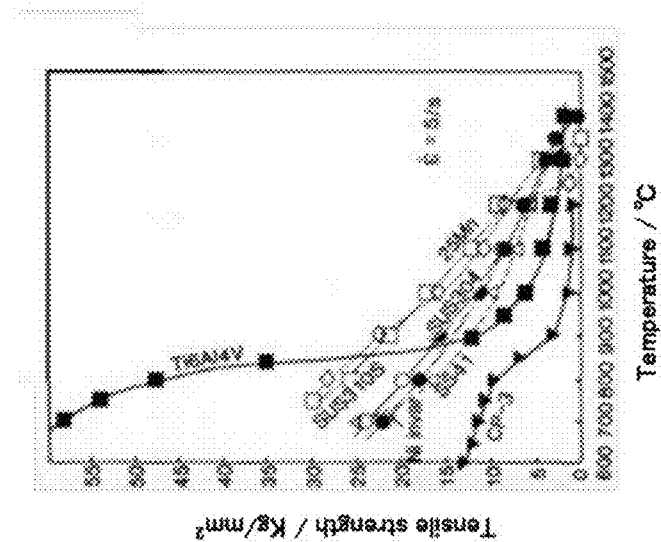
FIG. 4 is a graph showing the tensile strength of various metals at various temperatures.

As a specific example, the deformation stress (yield stress) of carbon steel at each temperature is shown in FIG. 3, and the tensile strength of various metals at each temperature is shown in FIG. 4. FIG. 3 is a graph published in "Tetsu-to-hagane, No. 11, 67 (1981), p. 140", and FIG. 4 is a graph published in "Tetsu-to-hagane, No. 6, 72 (1986), p. 55". As shown in these figures, the tensile strength and yield stress at a particular temperature are approximately constant for different materials.

That is, when the pressure P at the time of welding is set high, the material to be welded having higher yield strength and tensile strength can be discharged as a flash, and the welding temperature can be lowered. Also, as shown in FIGS. 3 and 4, since the tensile strength and the yield stress at a specific temperature are substantially constant depending on the material, the welding temperature can be controlled very accurately.

In order to control the welding temperature more accurately, it is preferable to set the pressure P to the yield stress of one member and/or the other member at the desired welding temperature. In the linear friction welding, the discharge of the flash 8 is started at the moment when the pressure P reaches the yield stress, and the welding temperature can be more accurately defined as compared with the case where the pressure P is set to a higher value (with the tensile strength as an upper limit).

In other words, the temperature rise caused by the frictional heat lowers the yield stress of the welded material, and the discharge of the flash 8 is started at the instant when the yield stress becomes lower than the pressure P. Here, the temperature increasing speed is increased by increasing the amplitude and the frequency at which the material to be welded slides, but the maximum reaching temperature (welding temperature) is not changed.

In the linear frictional welding, it is necessary to set welding parameters other than the pressure P (frequency and amplitude for exciting the welded material, welding time, solidity, and the like); however, these values are not limited as long as the effect of the present invention is not impaired, and may be appropriately set depending on the material, shape, size, and the like of the welded material.

When the one member 2 and/or the other member 4 is made of an iron-based metal, it is preferable to set the welding temperature to a temperature equal to or lower than the temperature $A_1$ of the iron-based metal used as the material to be welded. In iron-based metals, brittle martensite is formed by phase transformation, and there are cases in which welding is difficult and in which a welding portion is embrittled. On the other hand, by setting the welding temperature to the $A_1$ temperature or lower by the linear frictional welding method of the present invention, phase transformation does not occur, so that the formation of brittle martensite can be completely suppressed.

When one member 2 and/or the other member 4 is made of titanium or a titanium alloy, it is preferable that the welding temperature be equal to or lower than the β transus temperature of titanium or a titanium alloy. By setting the welding temperature to be equal to or lower than the β transus temperature of titanium or a titanium alloy, the structure of the welded portion can be made fine equiaxed grains, and a welded portion having both high strength and toughness can be formed.

(1-3) Third Step

The third step is a step of stopping the sliding in the second step to form a welding surface. In the linear friction welding method of the present invention, by stopping the sliding after the flash 8 is discharged from the entire surface of the interface 6 to be welded, a good welded body can be obtained. The pressure P applied to the material to be welded in the second step may be maintained as it is, or may be set to a higher value for the purpose of discharging the flash 8 and making the new surface abut more strongly.

Here, the timing at which the sliding is stopped after the flash 8 has been discharged from the entire surface of the interface 6 to be welded is not limited, but by observing the interface 6 to be welded from a direction substantially perpendicular to the direction of the sliding and performing the stopping of the sliding at the moment when the flash 8 has been discharged substantially parallel to the direction of the sliding, it is possible to form a good welded portion while suppressing the discharge amount of the flash 8 to a minimum (while suppressing consumption of the material to be welded to a minimum). The "direction substantially perpendicular to the direction of sliding" and the "direction substantially parallel to the direction of sliding" are both directions substantially perpendicular to the applied pressure.

In addition to proceeding at high speed, the welding process of linear frictional welding typically takes 0.2-0.5 seconds after the stop of sliding has been performed before the complete stop of operation. Therefore, it is extremely difficult to form a good welding area on the entire surface of the interface to be welded while minimizing the discharge of the flash 8, but this can be realized by executing the stop of the sliding at the instant when the flash 8 is discharged substantially parallel to the sliding direction (the welding area is formed on the entire surface of the interface to be welded while the sliding is completely stopped from the instant when the flash 8 is discharged substantially parallel to the sliding direction).

Further, by observing the interface 6 to be welded from a direction substantially perpendicular to the sliding direction and stopping the sliding at the moment when the flash 8 discharged substantially perpendicular to the sliding direction reach both the upper and lower ends of the interface 6 to be welded, the discharge amount of the flash 8 is slightly larger than that in the case where the sliding is stopped at the moment when the flash 8 are discharged substantially parallel to the sliding direction, but the removal of oxides and the like can be more reliably achieved.

Here, by observing the interface 6 to be welded from a direction substantially perpendicular to the sliding direction, the moment at which the flash 8 discharged substantially perpendicular to the sliding direction reach the upper and lower ends of the interface 6 to be welded can be easily grasped. More specifically, since the interface 6 to be welded emits light as the flash 8 is discharged, the moment when the light reaches both the upper and lower ends of the interface 6 to be welded may be observed.

Although representative embodiments of the present invention have been described above, the present invention is not limited to these, and various design modifications are possible, and all of these design modifications are included in the technical scope of the present invention.

EXAMPLE

A 2.6 mm thick medium carbon steel (JIS-S45C: 0.48% C-0.77% Mn-0.23% Si-0.08% Cr) was used as the material to be welded, and linear frictional welding was performed. The base material structure of the welded material was a ferrite-pearlite structure. The welding conditions were such that the frequency of excitation was 15 Hz, the amplitude was 2 mm, and the applied pressure was changed in the range of 100 to 250 MPa.

The obtained joint was cut and polished, and the cross-sectional structure was observed using an optical microscope and a scanning electron microscope (SEM). A JSM-7001FA manufactured by Nippon Electronics Co., Ltd. was used for the SEM observation.

Figure 5:
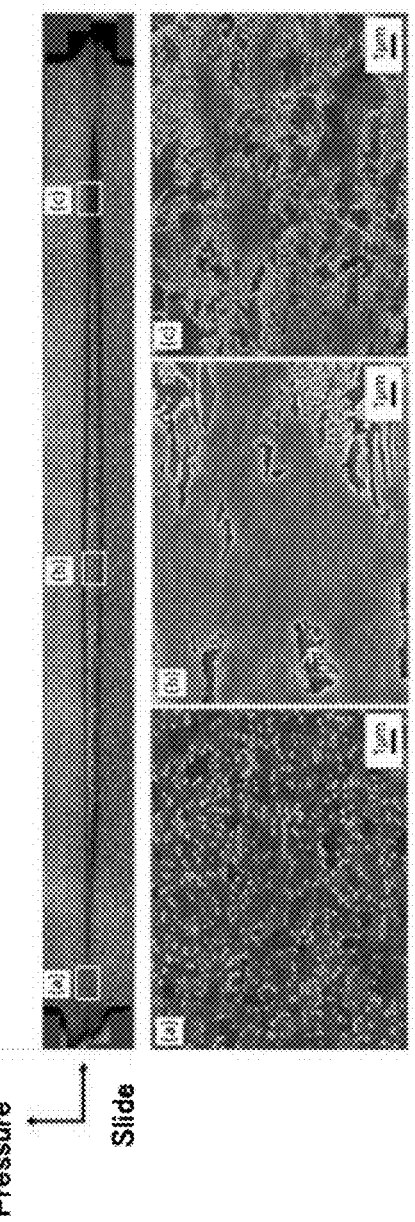
FIG. 5 is a cross-sectional observation result (100 MPa) of the welding portion obtained in the example.

FIG. 5 shows an optical micrograph of a cross-section of a joint portion obtained with an applied pressure of 100 MPa and an SEM microstructure of the joint portion. The observation position of the SEM microstructure corresponds to (a) to (c) of the optical microscope photograph.

When he applied pressure is 100 MPa, fine ferrites and spherical cementite are observed in (a), and it is understood that the welding temperature is equal to or lower than the temperature $A_1$ of the material to be welded in the region. On the other hand, martensite is formed in (b) and (c). In these regions, the welding temperatures are equal to or higher than the point $A_1$.

Figure 6:
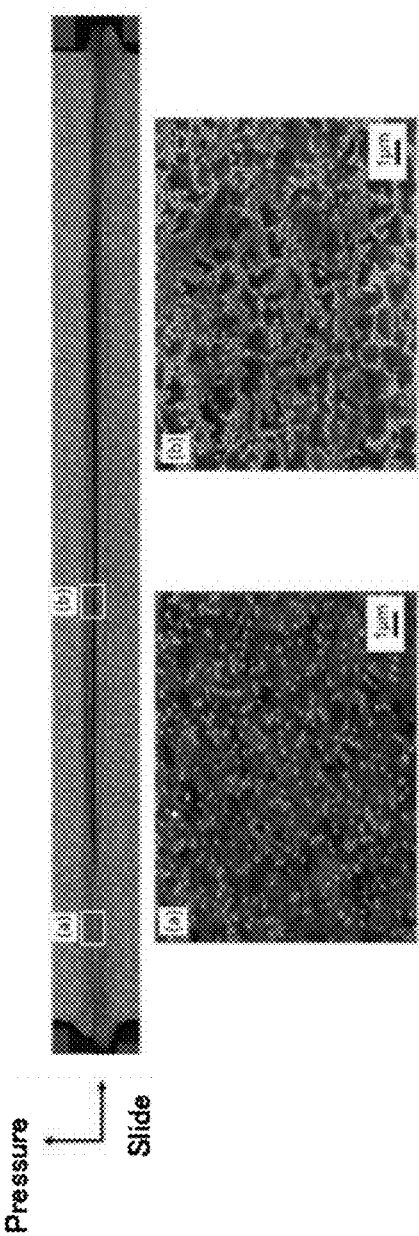
FIG. 6 is a cross-sectional observation result (200 MPa) of the joint portion obtained in the example.

FIG. 6 is an optical micrograph of a cross-section of a joint obtained with an applied pressure of 200 MPa and an SEM microstructure of the joint. The observation position of the SEM microstructure corresponds to (a) and (b) of the optical microscope photograph.

When the applied pressure is 200 MPa, fine ferrites and spherical cementite are observed in (a), and it is understood that the welding temperature is equal to or lower than the temperature $A_1$ of the material to be welded in the region. On the other hand, in (b), martensite is formed, and the welding temperature in this region is equal to or higher than the point $A_1$. However, the region in which martensite is formed, which is observed to be white by observation with an optical microscope, is greatly reduced to less than 100 MPa, which suggests that the welding temperature is lowered as the applied pressure is increased (100 MPa→200 MPa).

Figure 7:
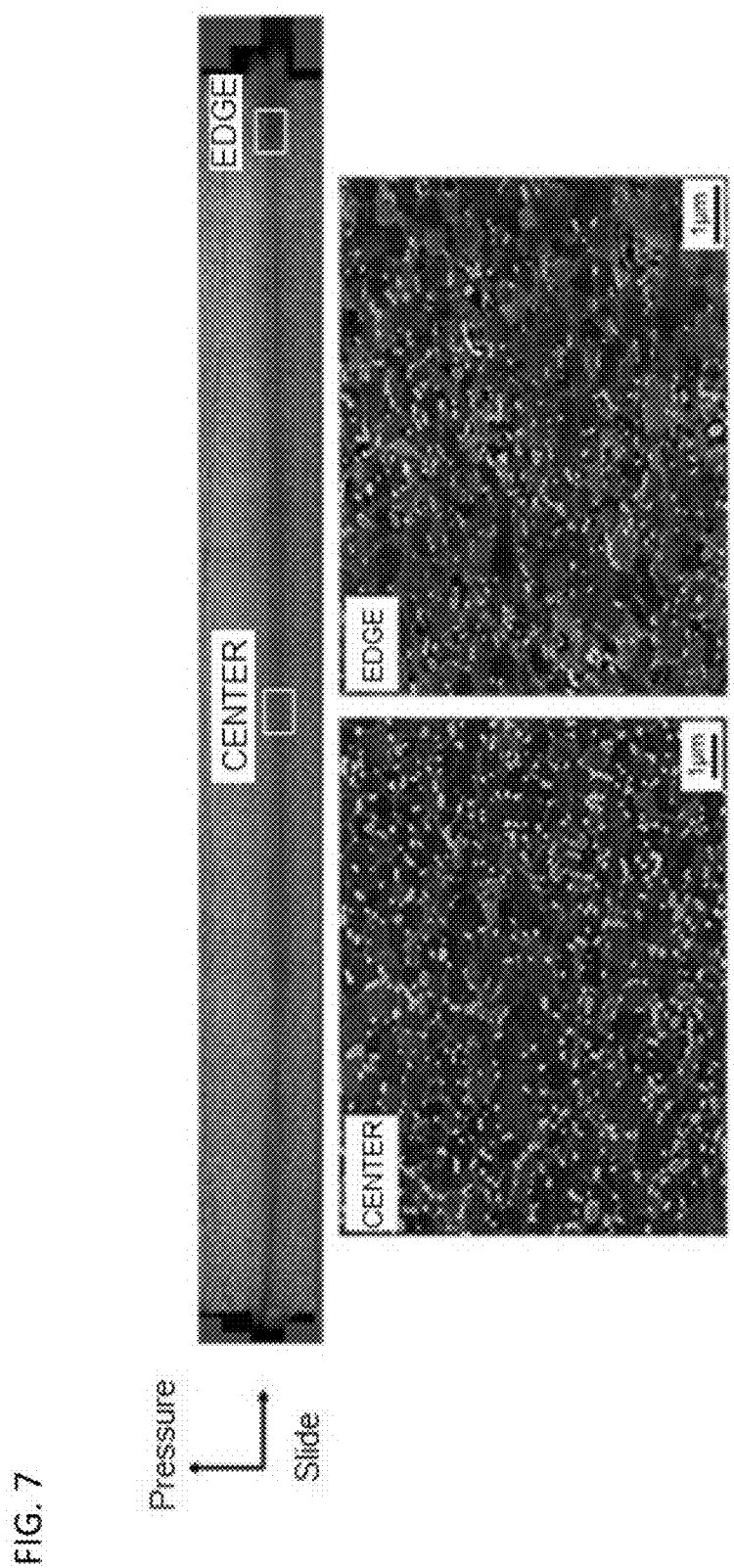
FIG. 7 is a cross-sectional observation result (250 MPa) of the joint portion obtained in the example.

FIG. 7 shows an optical micrograph of a cross-section of a joint portion obtained with an applied pressure of 250 MPa and an SEM microstructure of the joint portion. The observation position of the SEM microstructure corresponds to the center and the edge of the cross section of the joint.

When the applied pressure was 250 MPa, a structure composed of fine ferrite and spherical cementite was observed in all of the joints. This result means that the welding temperatures are equal to or lower than the point $A_1$ of the material to be welded in the whole area of the welding portion.

Figure 8:
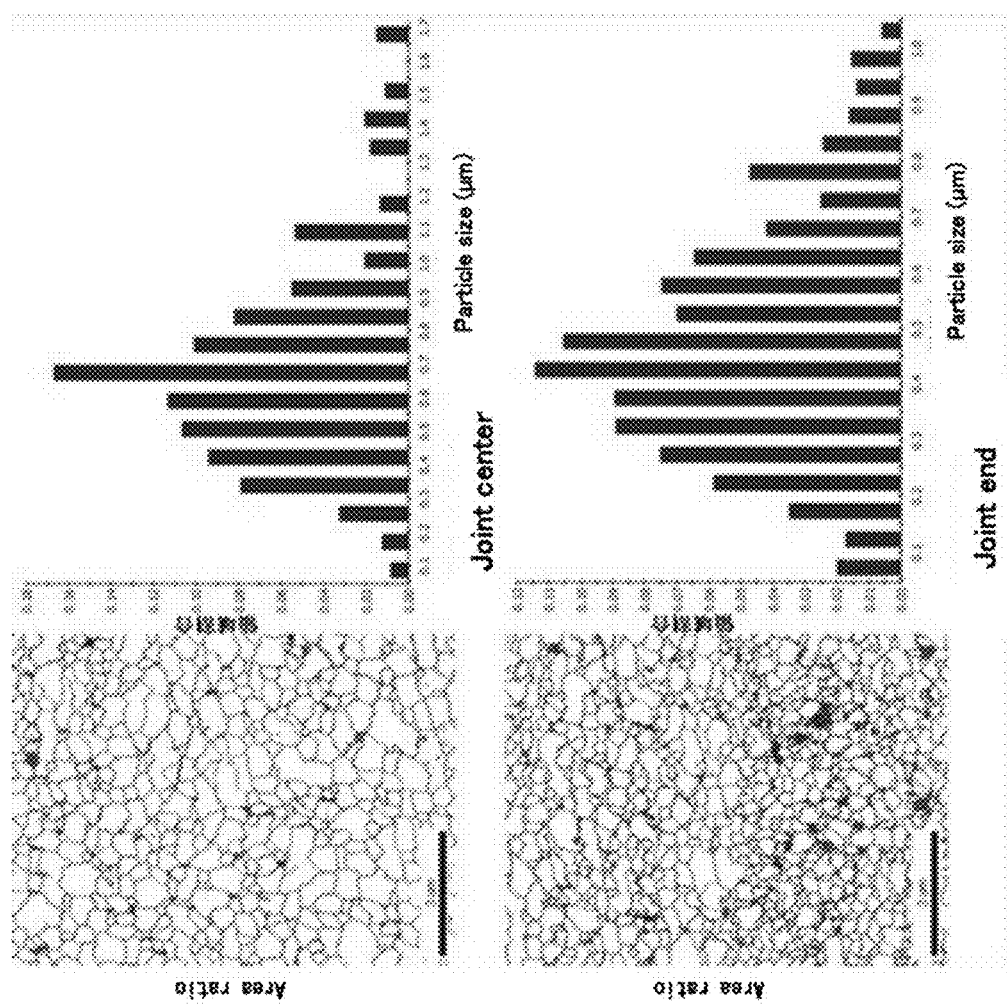
FIG. 8 is a grain boundary mapping and grain size distribution of the joint center and joint end of the joint obtained in the example (250 MPa).

FIG. 8 shows the grain boundary mapping and the grain size distribution of the joint center and the joint edge of the joint obtained with an applied pressure of 250 MPa. FE-SEM (a JSM-7001FA manufactured by Japan Electronics Co., Ltd.) and OIMdatacollection ver5.31 manufactured by TSL were used for measurements. The average particle diameter of the welding center portion is 0.70 μm, and the average particle diameter of the welding edge portion is 0.48 μm, and it is understood that fine particles having an average particle diameter of 1 μm or less are formed in both of them.

From the results of observation of the structure of the joint portion in the case where the applied pressure is 100 MPa to 250 MPa, it can be seen that the welding temperature decreases with an increase in the applied pressure.

Thermal imaging cameras (CPA-T640 manufactured by CINO) were used to measure the maximum temperature reached during welding. The absolute value of the value obtained by the thermal imaging camera is not necessarily accurate, but trends can be ascertained about the influence of the welding conditions on the welding temperature.

The welding temperatures measured by the thermal imaging camera were 864° C. for an applied pressure of 100 MPa, 677° C. for 200 MPa, and 600° C. for 250 MPa. Although it is the temperature near the surface of the joint that can be measured by the thermal imaging camera, the joint temperature decreases clearly with increasing applied pressure.

Figure 9:
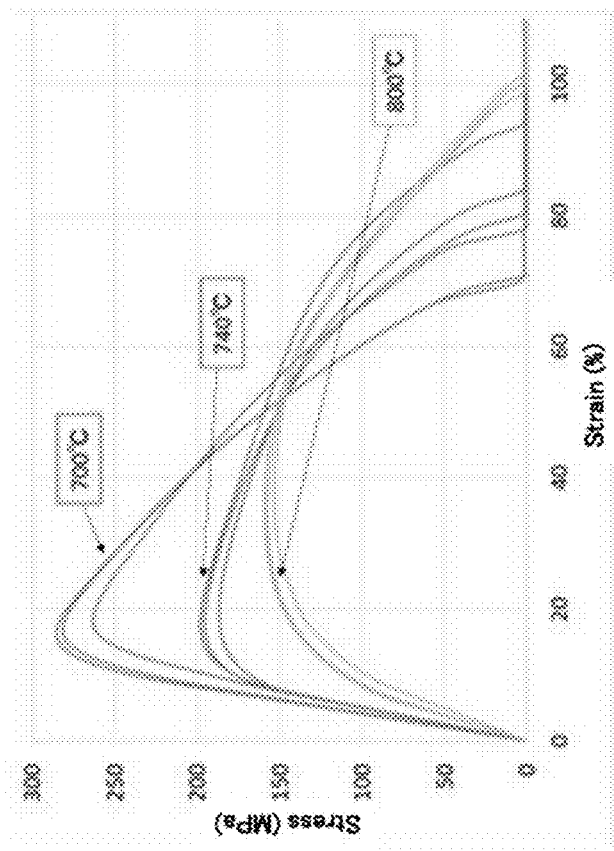
FIG. 9 is a stress strain curve of the welded material used in the examples.

Furthermore, in order to clarify the relationship between the temperature of the welded material and the yield stress and the tensile strength, a high-temperature tensile test of the welded material was performed at various temperatures. The test temperature was 700° C. which was equal to or lower than the $A_1$ point, 740° C. which was equal to or higher than the $A_1$ point to the $A_3$ point, and 800° C. which was equal to or higher than the $A_3$ point in the material to be welded, and the tensile speed was 2.8 mm/s which was the mean value of the deviation speed when the linear frictional welding was performed at the applied pressures of 100, 200, and 250 MPa. Three tests were performed at each temperature and the resulting stress-strain curves are shown in FIG. 9.

At any temperature, work hardening progresses after yield and stress decreases after reaching tensile strength. The 0.2% yield strength and tensile strength obtained from FIG. 9 are shown in Table 1. The 0.2% proof stress (yield stress) and the tensile strength decreased with the increase of the test temperature, and when focusing on the 0.2% proof stress (yield stress), the yield stress at 700° C. ($A_1$ point or less) was 212.6 MPa, which is very good agreement, as compared to the fact that the applied pressure of the welding condition in which the welding temperature was equal to or lower than the $A_1$ point was 250 MPa in all regions of the welding portion.

TABLE 1

| Temperature (° C.) | 0.2% yield strength (MPa) | Tensile strength (MPa) |
|---|---|---|
| 700 (below point $A_1$) | 212.6 | 276.9 |
| 740 (point $A_1$ to point $A_3$) | 154.7 | 193.7 |
| 800 (above point $A_3$) | 89.6 | 158.6 |

EXPLANATION OF SYMBOLS

2 One member
4 The other member
6 Interface to be welded
8 Flash

The invention claimed is:

1. A linear friction welding method, comprising:
   a first step of forming the interface to be welded by bringing one member into contact with an other member,
   a second step of repeatedly sliding the one member and the other member while applying a pressure substantially perpendicular to the interface to be welded, and discharging flash from the interface to be welded,
   a third step of forming a welded region at the interface by stopping the sliding, further including:
   controlling and reducing the required welding temperature by setting the pressure to be greater than or equal to a yield stress and less than or equal to a tensile strength of the one member and/or the other member to establish a desired welding temperature.

2. The linear friction welding method according to claim 1, further including controlling the welding temperature by setting the pressure to the yield stress of the one member and/or the other member at the desired welding temperature.

3. The linear friction welding method according to claim 1, wherein the one member and/or the other member is an iron-based metal.

4. The linear friction welding method according to claim 3, wherein the welding temperature is below the $A_1$ point of the iron-based metal.

5. The linear friction welding method according to claim 1, wherein the one member and/or the other member is titanium or titanium alloy.

6. The linear friction welding method according to claim 5, wherein the welding temperature is equal to or lower than the β transus temperature of the titanium or the titanium alloy.

7. The linear friction welding method according to claim 1, further including observing the interface to be welded from a direction substantially perpendicular to a direction of the sliding and performing the stopping of the sliding when the flash has been discharged substantially parallel to the direction of the sliding.

8. The linear friction welding method according to claim 7, further including providing the interface to be welded with a square or rectangular shape such to facilitate determination of a timing of the stopping of the sliding based on the discharge of the flash.

9. The linear friction welding method according to claim 1, wherein the welding temperature of the material of the one member and/or the other member in the vicinity of the welding interface decreases with an increase in the applied pressure beyond the set pressure.

* * * * *